March 9, 1943.   H. M. HUGE   2,313,440
CONTROL CIRCUIT
Filed June 10, 1941
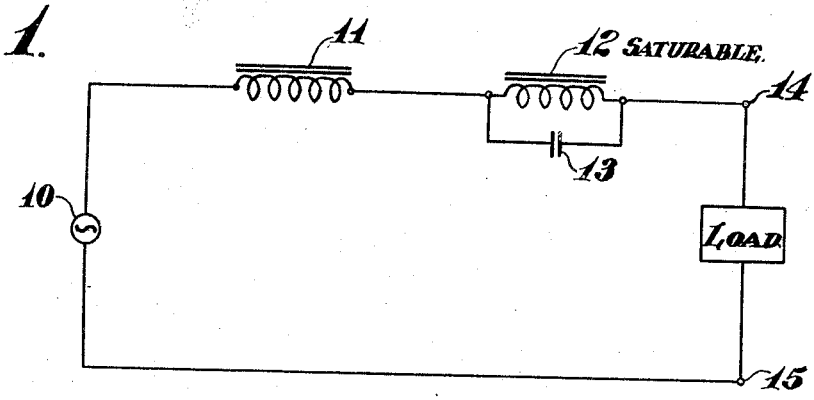
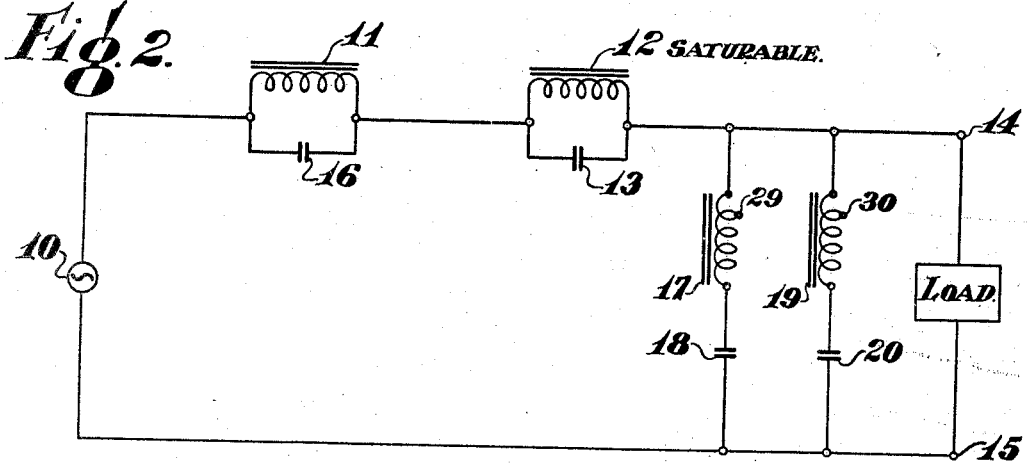
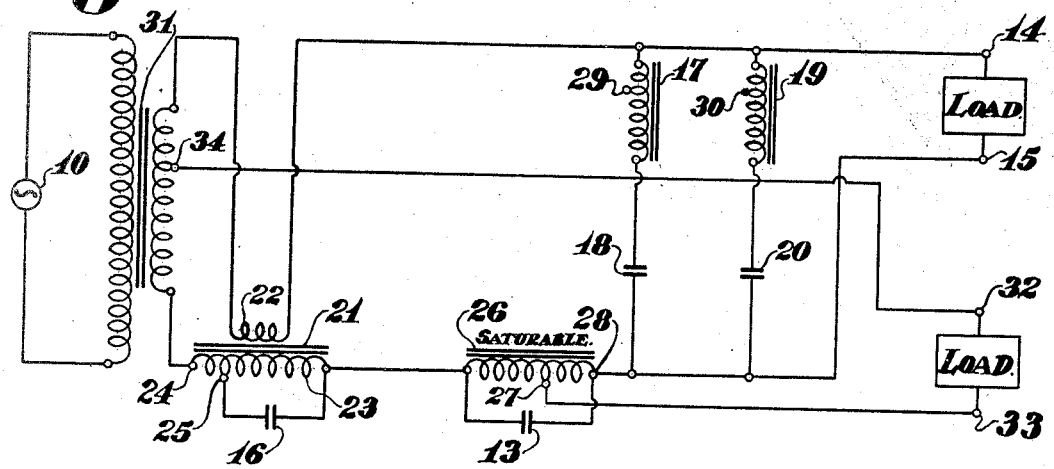
INVENTOR.
HENRY M. HUGE.
BY
Woodling and Krost
attys Patented Mar. 9, 1943

2,313,440

UNITED STATES PATENT OFFICE 2,313,440

CONTROL CIRCUIT

Henry M. Huge, Lorain, Ohio, assignor of one-half to Closman P. Stocker and one-half to E. M. Heavens Application June 10, 1941, Serial No. 397,445

18 Claims. (Cl. 171—242)

My invention relates in general to control circuits and more particularly to control circuits adapted to prevent overloads without appreciably affecting the output voltage under normal loads.

An object of my invention is to prevent overloads on an alternating current circuit without seriously affecting the output voltages under normal loads of any power factor.

Another object of my invention is the employment of the saturation of a magnetic core to control the maximum current in an alternating current circuit.

Another object of my invention is to maintain substantially the normal voltage on the load until the maximum load current is substantially reached.

Another object of my invention is the provision of a control device in which the control device may be changed from a circuit of relatively low impedance to one having a relatively high effective resistance with a small reduction in the load impedance below a predetermined critical value.

Another object of my invention is to control the characteristic of the load voltage with the load impedance.

Another object of my invention is the provision of a control circuit which maintains substantially normal voltage upon the load until the load current has almost reached its maximum value.

Another object of my invention is to utilize the elements of an overload protective circuit as elements of a wave filter.

A still further object of my invention is to provide an output network which, when connected to a source supplying more than one output voltage, will perform the same function at several voltage levels simultaneously.

Another object of my invention is to provide a current limiting device effective in limiting transient currents.

Another object of my invention is the provision of a current limiting device which is common to two or more loads and to a supply source supplying two or more output voltages in which the current limiting device limits the total power supplied to the two loads.

Other objects and a fuller understanding of my invention may be had by referring to the following description and claims, taken in conjunction with the accompanying drawing, in which like parts are designated by like reference characters, and in which:

Figure 1 shows a circuit adapted to prevent overloads embodying the features of my invention;

Figure 2 shows a combination overload protective circuit and wave filter in which the elements of the overload protective device function as elements of the wave filter; and Figure 3 shows my control circuit supplying two different output voltages through a combination network embodying the features of my invention.

With reference to Figure 1, my current control circuit comprises a substantially linear inductance element 11, a saturable inductance element 12 and a capacitor element 13. As illustrated, the saturable inductance element 12 and the capacitor element 13 are connected in parallel to form a parallel combination. The linear inductance element 11 and the parallel combination are connected in series with each other and with an alternating current supply source indicated by the reference character 10 and a load connected across the output terminals 14 and 15. When an open circuit exists across the output terminals 14 and 15, it is apparent that the voltage across these terminals is equal to the voltage of the source 10. The saturable inductance element 12 is constructed so that, at the frequency of the source 10, its impedance at low flux densities is considerably greater than the impedance of the capacitor element 13, and at high flux densities its impedance is of substantially the same order of magnitude as the capacitor element. The linear inductance element 11 is proportioned so that the entire circuit is approximately series resonant at the frequency of source 10, so long as the saturable inductance element 12 is not highly saturated. Therefore, under conditions in which the saturable inductance element 12 is not highly saturated, the net impedance in series with the output load is non-reactive and relatively low and thus the low impedance is mostly resistive. Accordingly, the voltage on the output terminals 14 and 15 will remain nearly equal to the voltage of the source 10 for a wide range of load currents. Moreover, because of the resistive character of the net impedance, inductive or capacitive loads will not produce a voltage rise, neither will they produce an excessive voltage drop. In my invention, I prefer to construct the substantially linear inductance element 11 with a magnetic core which includes a non-magnetic gap in its magnetic circuit.

As the load current increases, the voltage across the capacitor element 13 and consequently across the saturable inductance element 12 increases and the core thereof begins to saturate, detuning the circuit and reducing the output voltage. Upon the saturable inductance element 12 becoming saturated, the parallel combination consisting of the saturable inductance element 12 and the capacitor element 13 functions as a current limiting device and reduces the voltage across the load. In the operation of my device, a reduction in the load impedance above a predetermined critical value causes an increased load current to flow which tends to saturate the saturable inductance element 12. As the saturation of the saturable inductance element 12 begins to approach a certain value, the action thereof tends to detune the circuit from a series resonant condition. The detuning of the series resonant circuit begins to take place at a value of the load impedance which is slightly higher than the predetermined critical value. Further reduction in the load impedance in the neighborhood of the predetermined critical value does not cause a corresponding increase in the load current because further saturation of the saturable inductance element 12 increases the impedance of the parallel combination. The increase in the impedance of the parallel combination causes a greater voltage to appear across the combination which in turn causes a further increase in the impedance of the parallel combination. Therefore, a small reduction in the load impedance below the said predetermined critical value causes the circuit to have a relatively high effective resistance as the parallel combination approaches a condition of anti-resonance. Therefore, the voltage across the load is reduced to a fraction of its normal value with a relatively small reduction in the load impedance below the said predetermined critical value.

Summarizing, the linear inductance element 11 in combination with the capacitor element 13 comprises a circuit of relatively low impedance which is chiefly resistive to thereby maintain the voltage across the load substantially at a normal constant value for values of load impedance greater than a predetermined critical value. The parallel combination comprises a circuit of relatively high effective resistance to reduce the voltage across the load to a fraction of its normal value for values of load impedance less than the said predetermined value. Moreover, the linear inductance element 11 cooperates with the parallel combination to cause my control circuit to change from one of relatively low impedance to one of relatively high effective resistance upon a small reduction in the load impedance below the predetermined critical value. In my invention, the predetermined critical value of the load impedance is near the impedance of the load at which the maximum value of output load current is reached. It is therefore possible with my control circuit to obtain at normal voltage a load current which is a very high percentage of the maximum current which the parallel combination will allow to pass. It is possible to proportion the elements of my invention so that the short circuit current is considerably less than the full load current.

In my invention, I prefer to make the inductance 11 substantially linear over a wide range of current values. Consequently, sudden short circuits on the output terminals 14 and 15 cannot produce momentary saturation of the inductance 11 and as a result the transient currents are limited by this inductance. The linear inductance element 11 is constructed to have an impedance value which is large compared to the value of the effective impedance of the alternating current supply source.

The fact that the linear inductance element is constructed to have a large impedance value as compared to the value of the effective impedance of the alternating current supply source, aids both in limiting the transient current and in obtaining the desired output voltage characteristics in the neighborhood of the predetermined critical load impedance. Therefore, in my invention I am able to control the extent to which the cumulative action affects the output voltage reduction in the neighborhood of the predetermined critical load impedance.

Figure 2 shows a current control circuit according to my invention, in which the current limiting elements act as some of the elements of a wave filter and comprises an anti-resonant circuit means including capacitor 16 and inductance 17 and current limiting circuit means including capacitor 13 and saturable inductance 12 connected in series with each other and with the said source and load.

A particular instance in which the circuit of Figure 2 can be used to advantage is in case the voltage of source 10 contains a relatively large third harmonic component. In this case the circuit of Figure 1 presents an inductive impedance to the harmonic, and low power factor capacitive loads cause an undesirable voltage rise and wave distortion in the output voltage. If capacitor 16 and inductance 17 of Figure 2 are proportioned to be anti-resonant to the third harmonic and to maintain the resonance to the fundamental with capacitor 13, no difficulty with the third harmonic will be encountered at any power factor. But the wave shape at no load will contain the third harmonic whereas the wave shape under load will not, so it is desirable to tune the series circuit of capacitor 18 and inductance 17 to the third harmonic to maintain the same wave shape and output voltage at no load as under load. Thus, the reduction of the third harmonic aids in maintaining a substantially constant normal voltage.

Under some conditions it may be desirable to eliminate a higher harmonic from the output voltage, and the tuned circuit comprising capacitor 20 and inductance 19 is shown in Figure 2 for this purpose. By tuning the circuit substantially to series resonance at the undesired frequency, a high attenuation at that frequency can be obtained. Linear inductances 17 and 19 are shown provided with taps, indicated generally by the reference characters 29 and 30. These taps are shown as a convenient arrangement to facilitate tuning of the resonant circuits.

When the complete elimination of the third harmonic is less important than the elimination of another undesired frequency, capacitor 16 and inductance 17 may be tuned substantially to anti-resonance at that undesired frequency, and the inductance 19 and the capacitor 20 may be tuned substantially to series resonance. Of course, series resonance to the fundamental should still be maintained in the circuit supplying current to the load. In this case the third harmonic is still controlled by the series circuits 17 and 18 and capacitive loads will not appreciably affect the harmonic content or magnitude of the output voltage.

Figure 3 shows a circuit in which the supply transformer 31 of source 10 is provided with a tap 34 so that the source supplies two output voltages. These two voltages are supplied to two loads through my current limiting circuit the higher voltage being supplied on terminals 14 and 15 and the lower voltage on terminals 32 and 33. Transformer 21 in Figure 3 takes the place of linear inductance 11 in Figures 1 and 2 and saturable autotransformer 26 in Figure 3 replaces saturable inductance 12 in Figures 1 and 2.

Winding 23 on transformer 21 is shown provided with a tap 25 with capacitor 16 connected to this tap. This arrangement makes it possible to use a standard size capacitor for 16 and at the same time to maintain the proper tuning. Of course, this arrangement applies only to a particular example and in another case it might be preferable to connect the capacitor 16 to terminal 24 instead of 25.

Saturable auto-transformer 26 is provided with a tap indicated as 27. Because the voltage on terminals 32 and 33 is lower than on terminals 14 and 15 the saturable unit 26 as viewed from these terminals must be made to have a lower impedance and to saturate at a higher current value than when viewed from terminals 14 and 15 in order to obtain the full volt-ampere peak load at the terminals 32 and 33. The impedance through winding 23 of transformer 21 is of the proper value to make a substantially series resonant circuit for the current supplied through terminals 32 and 33 and the impedance through windings 22 and 23 is of the proper value to make a substantially series resonant circuit for the current supplied through terminals 14 and 15.

Capacitor 13 is shown connected to terminal 28 on transformer 26, but it may be connected to terminal 27 if preferred; in this case a larger capacitor is used.

The resonant circuits which comprise elements 17, 18, 19 and 20 and which are connected across the leads to terminals 14 and 15 in Figure 3, may be tuned as explained in connection with Figure 2. Furthermore, because the turn ratios of the windings in the circuit are all the same, the effect of the filter on the voltage across terminals 32 and 33 is substantially the same as its effect on the voltage across terminals 14 and 15.

The current limiting effect of the circuit of Figure 3 is such that the total load supplied from terminals 14 and 15 and terminals 32 and 33 is limited to a predetermined total volt-ampere value, regardless of how the load may be divided between the two sets of output terminals. By providing additional windings on transformer 21 and additional taps on 26, the method of supplying two output voltages as shown in Figure 3 can be extended to provide three or more voltages if desired.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A current control device arranged to be connected between a load and an alternating current supply source comprising, in combination, a substantially linear inductance element, a saturable inductance element, and a capacitor element, said linear and said saturable inductance elements being connected in series, said capacitor element being connected in parallel with the saturable inductance element and forming therewith a parallel combination, said linear inductance element cooperating with said parallel combination to minimize the voltage drop in the said control device for a range of values of load impedance greater than a predetermined critical value and to build up a large voltage drop in the said control device for a range of values of load impedance less than said predetermined critical value.

2. A current control device arranged to be connected between a load and an alternating current supply source comprising, in combination, a substantially linear inductance element, a saturable inductance element, and a capacitor element, said linear and said saturable inductance elements being connected in series, said capacitor element being connected in parallel with the saturable inductance element and forming therewith a parallel combination, said linear inductance element cooperating with said parallel combination to minimize the voltage drop in the said control device for a range of values of load impedance greater than a predetermined critical value and to build up a large voltage drop in the said control device for a range of values of load impedance less than said predetermined critical value, said predetermined critical value of the load impedance being near the impedance of the load at which maximum value of output load current is reached.

3. A current control device arranged to be connected between a load and an alternating current supply source comprising, in combination, a substantially linear inductance element, a saturable inductance element, and a capacitor element, said linear and said saturable inductance elements being connected in series, said capacitor element being connected in parallel with the saturable inductance element and forming therewith a parallel combination, said linear inductance element cooperating with said parallel combination to minimize the voltage drop in the said control device for a range of values of load impedance greater than a predetermined critical value and to build up a large voltage drop in the said control device for a range of values of load impedance less than said predetermined critical value, said linear inductance element having an impedance value which is large compared to the value of the effective impedance of the alternating current supply source.

4. A current control device arranged to be connected between a load and an alternating current supply source comprising, in combination, a substantially linear inductance element, a saturable inductance element, and a capacitor element, said linear and said saturable inductance elements being connected in series, said capacitor element being connected in parallel with the saturable inductance element and forming therewith a parallel combination, said linear inductance element in combination with the capacitor element comprising a circuit of relatively low effective impedance which is chiefly resistive for a range of values of load impedance greater than a predetermined critical value to minimize the voltage drop in the said control device throughout said range of values, said parallel combination comprising a circuit of relatively high effective impedance for a range of values of load impedance less than said predetermined critical value to introduce a large voltage drop in the said control device throughout said last mentioned range of values.

5. A current control device arranged to be connected between a load and an alternating current supply source comprising, in combination, a substantially linear inductance element, a saturable inductance element, and a capacitor element, said linear and said saturable inductance elements being connected in series, said capacitor element being connected in parallel with the saturable inductance element and forming therewith a parallel combination, said linear inductance element in combination with the capacitor element comprising a circuit of relatively low effective impedance which is chiefly resistive for a range of values of load impedance greater than a predetermined critical value to minimize the voltage drop in the said control device throughout said range of values, said parallel combination comprising a circuit of relatively high effective impedance for a range of values of load impedance less than said predetermined critical value to introduce a large voltage drop in the said control device throughout said last mentioned range of values, said linear inductance element cooperating with said parallel combination to cause said control device to change from one of relatively low effective impedance to one of relatively high effective impedance upon a relatively small reduction in the load impedance below said predetermined critical value.

6. A current control device arranged to be connected between a load and an alternating current supply source comprising, in combination, a substantially linear inductance element, a saturable inductance element, and a capacitor element, said linear and said saturable inductance elements being connected in series, said capacitor element being connected in parallel with the saturable inductance element and forming therewith a parallel combination, said linear inductance element in combination with the capacitor element comprising a circuit of relatively low effective impedance which is chiefly resistive for a range of values of load impedance greater than a predetermined critical value to minimize the voltage drop in the said control device throughout said range of values, said parallel combination comprising a circuit of relatively high effective impedance for a range of values of load impedance less than said predetermined critical value to introduce a large voltage drop in the said control device throughout said last mentioned range of values, said linear inductance element cooperating with said parallel combination to cause said control device to change from one of relatively low effective impedance to one of relatively high effective impedance upon a relatively small reduction in the load impedance below said predetermined critical value, said predetermined critical value of the load impedance being near the impedance of the load at which maximum value of output load current is reached.

7. A current control device arranged to be connected between a load and an alternating current supply source comprising, in combination, a substantially linear inductance element, a saturable inductance element, and a capacitor element, said linear and said saturable inductance elements being connected in series, said capacitor element being connected in parallel with the saturable inductance element and forming therewith a parallel combination, said linear inductance element in combination with the capacitor element comprising a circuit of relatively low effective impedance which is chiefly resistive for a range of values of load impedance greater than a predetermined critical value to minimize the voltage drop in the said control device throughout said range of values, said parallel combination comprising a circuit of relatively high effective impedance for a range of values of load impedance less than said predetermined critical value to introduce a large voltage drop in the said control device throughout said last mentioned range of values, said linear inductance element cooperating with said parallel combination to cause said control device to change from one of relatively low effective impedance to one of relatively high effective impedance upon a relatively small reduction in the load impedance below said predetermined critical value, said predetermined critical value of the load impedance being near the impedance of the load at which maximum value of output load current is reached, said saturable inductance element having at low flux densities, a higher impedance than the impedance of the capacitor element, and at high flux densities an impedance of substantially the same order of magnitude as the capacitor element.

8. A current control device arranged to be connected between a load and an alternating current supply source comprising, in combination, a substantially linear inductance element, a saturable inductance element, and a capacitor element, said linear and said saturable inductance elements being connected in series, said capacitor element being connected in parallel with the saturable inductance element and forming therewith a parallel combination, said linear inductance element in combination with the capacitor element comprising a circuit of relatively low effective impedance which is chiefly resistive for a range of values of load impedance greater than a predetermined critical value to minimize the voltage drop in the said control device throughout said range of values, said parallel combination comprising a circuit of relatively high effective impedance for a range of values of load impedance less than said predetermined critical value to introduce a large voltage drop in the said control device throughout said last mentioned range of values, said linear inductance element cooperating with said parallel combination to cause said control device to change from one of relatively low effective impedance to one of relatively high effective impedance upon a relatively small reduction in the load impedance below said predetermined critical value, said linear inductance element having an impedance value which is large compared to the value of the effective impedance of the alternating current supply source.

9. A current control device adapted to be connected between a source of alternating current and a load, comprising in combination a substantially linear inductance element, a saturable inductance element and a capacitor element, said linear and saturable inductance elements being connected in series, the capacitor element being connected in parallel with the saturable inductance element, said control device for small values of current being a substantially series resonant circuit to the frequency of said source and at a predetermined higher value of current being a substantially anti-resonant circuit to the frequency of said source.

10. Control means adapted to be connected between a source of alternating current and a load, comprising a series resonant circuit to the frequency of said source for normal loads and saturable inductive circuit means for causing the control means to become anti-resonant to the frequency of said source at a predetermined over-load condition.

11. An alternating current control circuit comprising, in combination, a first parallel combination consisting of a first capacitive element and a saturable inductive element, a second parallel combination consisting of a second capacitive element and a substantially linear inductive element, said parallel combinations being connected in series and constituting a circuit having a relatively low impedance for values of current which produce low flux densities in said saturable inductive element and having a relatively high effective resistance for values of current which cause saturation of said saturable inductive element, said second parallel combination being anti-resonant at a fixed frequency higher than the frequency of the current which magnetizes the saturable inductive element.

12. Control means adapted to be connected between a source of alternating current and a load, comprising a circuit which for normal load currents is substantially series resonant to the frequency of said source, saturable inductive means for causing the said circuit to become highly resistive to the frequency of said source at a predetermined over-load condition, and a second circuit connected to said first circuit and substantially in parallel with the load, said second circuit being series resonant to a frequency higher than the frequency of said source.

13. An alternating current control circuit adapted to be connected between a source of alternating current and a load comprising, in combination, anti-resonant circuit means and current limiting circuit means connected in series with each other and with the said source and load, a plurality of series resonant circuits connected substantially in shunt relation with said load, each of said series resonant circuits being resonant to a different harmonic of the frequency of said source and said anti-resonant circuit means being anti-resonant to a harmonic of the frequency of said source.

14. An alternating current control circuit adapted to be connected between a source of alternating current and a load comprising, in combination, a first parallel combination consisting of a first capacitive element and a saturable inductive element, a second parallel combination consisting of a second capacitive element and a substantially linear inductive element, said parallel combinations being connected in series with each other and the source of current and the load, a series circuit substantially resonant to the third harmonic of said source and connected substantially in shunt relation with the load, said first parallel combination constituting a current limiting device for protection against overloads, and said second parallel combination constituting substantially an anti-resonant circuit to a harmonic of the source frequency.

15. An alternating current control circuit adapted to be connected between a source of alternating current and a load comprising, in combination, anti-resonant circuit means and current limiting circuit means connected in series with each other and with the said source and load, a series resonant circuit connected substantially in shunt relation with said load, said series circuit being resonant to a harmonic of the frequency of said source and said anti-resonant circuit means being anti-resonant to a harmonic of the frequency of said source.

16. An alternating current control circuit adapted to be connected between a source of alternating current and a load comprising, in combination, anti-resonant circuit means and current limiting circuit means connected in series with each other and with the said source and load, a series resonant circuit connected substantially in shunt relation with said load, said series resonant circuit and said anti-resonant circuit means being adjusted to resonance and anti-resonance respectively, to the same harmonic of the frequency of said source.

17. A current control device arranged to be connected between a load and an alternating current supply source comprising, in combination, a substantially linear inductance element, a saturable inductance element, and a capacitor element, said linear and said saturable inductance elements being connected in series, said capacitor element being connected in parallel with the saturable inductance element and forming therewith a parallel combination, said linear inductance element cooperating with said parallel combination to maintain the voltage across the load substantially at a normal constant value for values of load impedance greater than a predetermined critical value and to reduce the voltage across the load to a fraction of its normal value with a relatively small reduction in the load impedance below said predetermined critical value, a series circuit substantially resonant to the third harmonic of said source and connected substantially in shunt relation with the load, said series circuit reducing the third harmonic voltage in the load and thus aiding in maintaining a substantially constant normal voltage.

18. An alternating current control circuit adapted to be connected between a source of alternating current and a plurality of loads, said control circuit being adapted to supply a different output voltage to each of said loads, comprising, in combination, anti-resonant circuit means and current limiting circuit means connected in series with each other and with said source, said anti-resonant circuit means and current limiting circuit means being common to at least two of said different output voltages, and series resonant circuit means being connected substantially in parallel with at least one of said pluralities of loads, said anti-resonant circuit means and series resonant circuit means being tuned to a harmonic of the frequency of said source.

HENRY M. HUGE.